United States Patent
Pyun et al.

(10) Patent No.: US 11,260,795 B2
(45) Date of Patent: Mar. 1, 2022

(54) DISPLAY INSIDE MIRROR OF VEHICLE

(71) Applicants: Hyundai Motor Company, Seoul (KR); Kia Motors Corporation, Seoul (KR)

(72) Inventors: Hyun Joong Pyun, Gyeonggi-do (KR); Nak Kyoung Kong, Gyeonggi-do (KR); Young Ik Cho, Gyeonggi-do (KR); Byung Seob Yu, Gyeonggi-do (KR); Chang Ju Kim, Daegu (KR); Su Young Choi, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 10 days.

(21) Appl. No.: 16/657,335

(22) Filed: Oct. 18, 2019

(65) Prior Publication Data

US 2020/0298759 A1    Sep. 24, 2020

(30) Foreign Application Priority Data

Mar. 19, 2019  (KR) .................. 10-2019-0031030

(51) Int. Cl.
*B60R 1/04*  (2006.01)
*B60R 1/02*  (2006.01)
*B60R 1/08*  (2006.01)

(52) U.S. Cl.
CPC ............... *B60R 1/04* (2013.01); *B60R 1/025* (2013.01); *B60R 1/086* (2013.01)

(58) Field of Classification Search
CPC .......... B60R 1/04; B60R 1/086; B60R 1/025; B60R 2001/1253; B60R 1/12; B60R 2001/1215
See application file for complete search history.

(56) References Cited

U.S. PATENT DOCUMENTS

| | | | | |
|---|---|---|---|---|
| 2,988,724 | A | * | 6/1961 | Larkin .................. H01H 5/045 439/441 |
| 2009/0052003 | A1 | * | 2/2009 | Schofield ............ B32B 37/1292 359/267 |
| 2016/0236620 | A1 | * | 8/2016 | Gomez Timoneda . B62D 65/16 |
| 2019/0232873 | A1 | * | 8/2019 | Timoneda ............... B60R 1/088 |
| 2020/0247320 | A1 | * | 8/2020 | Nozaki .................... B60R 1/086 |

FOREIGN PATENT DOCUMENTS

KR        20110078721 A        7/2011

* cited by examiner

*Primary Examiner* — Sath V Perungavoor
*Assistant Examiner* — Tyler B Edwards
(74) *Attorney, Agent, or Firm* — Mintz Levin Cohn Ferris Glovsky and Popeo, P.C.; Peter F. Corless

(57) ABSTRACT

A display inside mirror includes a housing configured to be secured to a windshield glass, the housing having an opening formed therein, a mirror part disposed in the opening, a display unit disposed so as to face the mirror part, a control unit disposed adjacent to the display unit so as to control the transmission of a display image, a tilting lever disposed at one end of the housing so as to tilt the mirror part, and a switch unit disposed at the tilting lever so as to allow the power from the control unit to be selectively applied to the display unit.

9 Claims, 7 Drawing Sheets

[STOPPER-STILL ZONE – NON-CONTACT WITH CLIP (LCD Off)]

[STOPPER-STILL ZONE – CONTACT WITH CLIP (LCD Off)]

DISPLAY INSIDE MIRROR OF VEHICLE

CROSS-REFERENCE TO RELATED APPLICATION

This application claims under 35 U.S.C. § 119(a) the benefit of Korean Patent Application No. 10-2019-0031030 filed on Mar. 19, 2019, the entire contents of which are incorporated herein by reference.

BACKGROUND

(a) Technical Field

The present disclosure relates to a display inside mirror, more particularly, to the display inside mirror equipped with a switch unit, which is integrally formed with a tilting lever disposed at an end of a housing, so as to perform a tilting movement of a mirror part and to perform ON/OFF control of a display unit independently of the tilting movement of the mirror part.

(b) Description of the Related Art

A device for providing a view to a rear of a vehicle includes an inside mirror and outside mirrors. In such a device, the inside mirror is internally mounted on a center of an upper region of a windshield glass or a center of a front portion of a headliner so as to provide the view to the rear of the vehicle, and the outside mirrors are externally mounted on an upper and front region of two door panels of the vehicle so as to provide views to the rear on both lateral sides of the vehicle.

Vehicles are increasingly being provided with inside mirrors equipped with a display unit, so as to ensure that an adequate amount of light is introduced into the inside of a vehicle, and to control the amount of light introduced from the headlights of another vehicle that is located behind the vehicle so as to provide a clear view to the rear of the vehicle during night driving.

FIG. 1 (RELATED ART) is a view illustrating a conventional inside mirror 10 equipped with a display unit.

As illustrated in FIG. 1, the inside mirror 10, which includes a housing 10 having an opening, is constructed such that a display unit 13 and a mirror 12 are aligned with each other and are positioned in the opening.

When the display mirror and the general mirror are positioned in an aligned manner in the opening as in this case, a dual image occurs on the inside mirror, thereby making it difficult to ensure a clear rearward view.

Accordingly, in order to overcome the problems with such a conventional inside mirror, there is a need to provide a structure for tilting the display mirror and the general mirror and efficient ON/OFF control of the display for preventing a dual image.

SUMMARY

The present disclosure provides a display inside mirror, which is configured to independently perform tilting movement of the inside mirror including a display unit and apply power to the display unit.

The present disclosure also provides a display inside mirror, which is provided with a switch unit configured to be inserted into a tilting lever and which is able to perform both tilting movement of a mirror part and ON/OFF control of a display through integral construction thereof.

In one aspect, the present disclosure provides a display inside mirror including a housing configured to be secured to a windshield glass, the housing having an opening formed therein, a mirror part disposed in the opening, a display unit disposed so as to face the mirror part, a control unit disposed adjacent to the display unit so as to control transmission of a display image, a tilting lever disposed at one end of the housing so as to tilt the mirror part, and a switch unit disposed at the tilting lever so as to allow power from the control unit to be selectively applied to the display unit.

In a preferred embodiment, the display inside mirror may further include an upper clip disposed at an upper end of the tilting lever so as to be adjacent to the switch unit, and a lower clip disposed at a lower end of the tilting lever, wherein the upper and lower clips are connected to the control unit via respective wires.

In another preferred embodiment, the switch unit may be disposed in the tilting lever between the upper clip and the lower clip so as to allow the upper and lower clips to be electrically connected to each other so as to allow power to be applied to the display unit.

In still another preferred embodiment, the switch unit may include a conductive portion configured to be positioned between the upper and lower clips so as to be brought into contact therewith, and non-conductive portions disposed at two ends of the conductive portion and projecting outwards from the tilting lever.

In yet another preferred embodiment, when the switch unit is pushed into the tilting lever, the conductive portion may be brought into contact with the upper and lower clips so as to allow power to be applied to the display unit.

In still yet another preferred embodiment, at least a portion of the tilting lever may be disposed in the housing, and the portion of the tilting lever that is disposed in the housing may be provided with a wire through hole.

In a further preferred embodiment, the display inside mirror may further include a support disposed in the housing, the support including a first shaft about which the mirror part is tilted, and the support being configured to tilt the mirror part in linkage with a second shaft disposed at an end of the tilting lever.

In another further preferred embodiment, the end of the tilting lever that faces the support may be provided with a recess and an end of the support may be disposed in the recess such that the support is rotated by movement of the tilting lever.

In still another further preferred embodiment, each of the upper and lower clips may have a ">"-shaped cross-section such that, when the switch clip is positioned between the upper and lower clips and is engaged therewith, the upper and lower clips exert predetermined elastic force with respect to each other.

In yet another further preferred embodiment, the mirror part may be composed of an electronic chromic mirror (ECM).

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
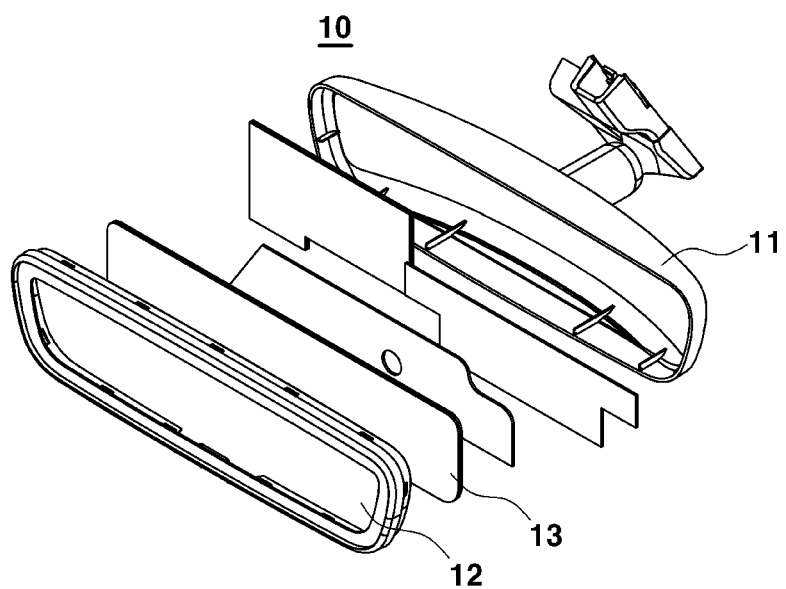
FIG. 1 (RELATED ART) is a perspective view of a conventional inside mirror including a display unit.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments according to the present disclosure will be described in more detail with reference to the accompanying drawings. The embodiments according to the present disclosure may be modified in various forms, and the scope according to the present disclosure should not be interpreted as being limited to the following embodiments. The embodiments are provided to more completely describe the disclosure to those of ordinary skill in the art.

In addition, in the following description, it will be understood that terms, such as "first", "second", etc., are used only to distinguish elements having the same name from each other and do not limit their sequence.

In addition, in this specification, the term "height direction" refers to the upward and downward direction relative to the height of a vehicle, and the term "longitudinal direction" refers to the position in the forward and rearward direction of a vehicle.

The present disclosure is directed to a display inside mirror 100, which is constructed so as to be able to provide a rearward view by use of a mirror part 110 in the closed state and to display an external image of the vehicle by use of a display unit 130 upon a user's request. Preferably, an image that is provided by use of the display unit 130 is taken by a camera, which is positioned outside the vehicle. The image that is displayed on the display unit 130 may be changed upon a user's request.

Figure 2:
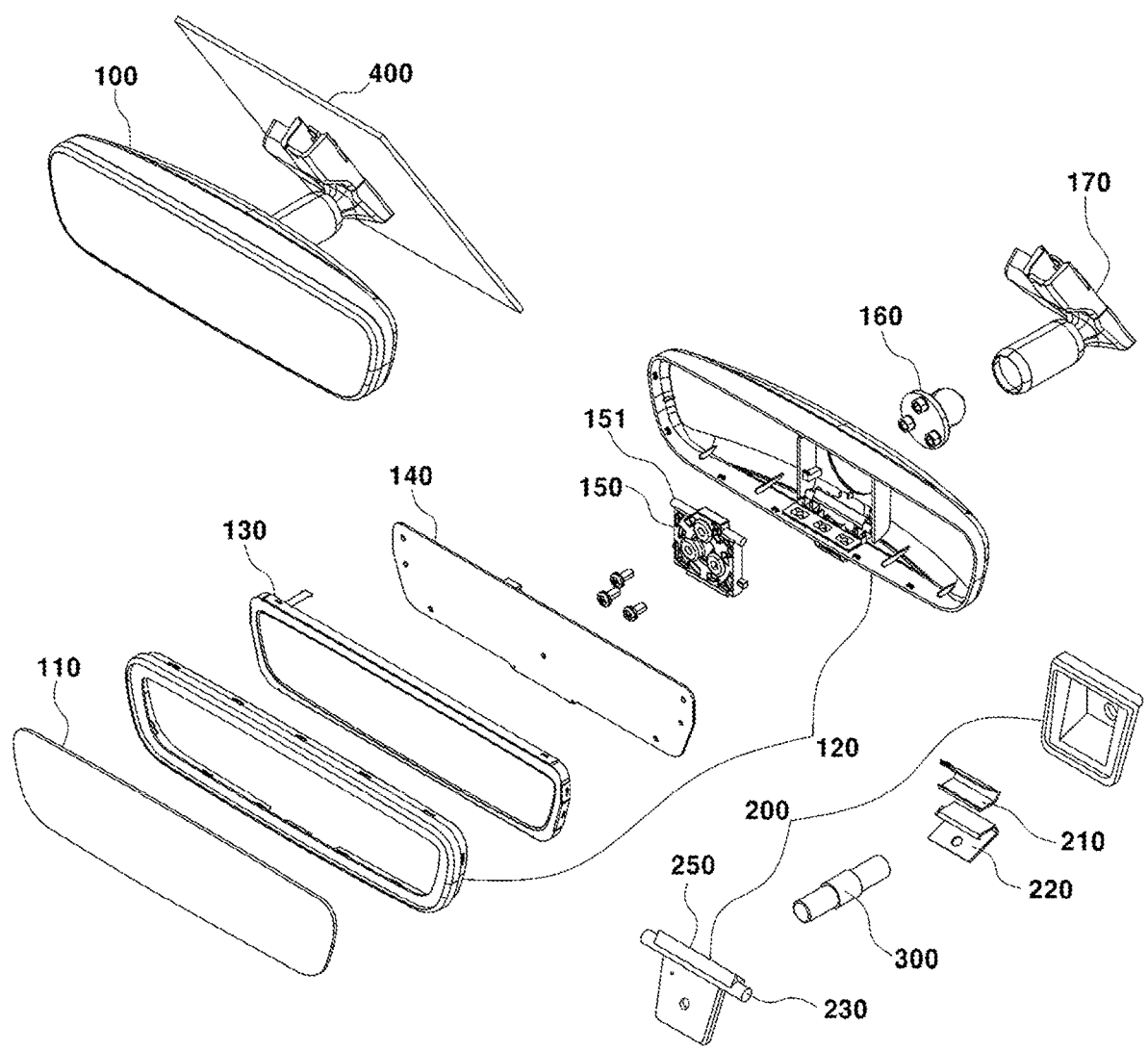
FIG. 2 is an exploded perspective view of components of a display inside mirror according to an embodiment of the present disclosure.

FIG. 2 illustrates the display inside mirror 100 according to an embodiment of the present disclosure, which is positioned so as to be secured to a windshield glass 400.

A housing 120, which includes an opening that faces in a rearward direction of the vehicle, is coupled to an end of a stay mount 160, and the other end of the stay mount 160 is coupled to a channel mount 170, which is secured to the windshield glass 400.

Preferably, the stay mount 160 is coupled to a support 150, which is configured to allow the housing 120 to be tilted, and extends inside the housing 120. The stay mount 160 is constructed so as to be rotated with the support 150 upon rotation of the support 150.

When a tilting lever 200 is rotated, the support 150, which is connected to one side of the tilting lever 200 is rotated in the direction opposite the rotational direction of the tilting lever 200, and the stay mount 160 secured to the support 150 is tilted to a predetermined angle. The open face of the housing 120, which is coupled to the stay mount 160, is tilted to an angle as large as the angle at which the stay mount 160 is tilted.

The stay mount 160 and the channel mount 170 are coupled to each other via a ball bearing disposed therebetween, thereby allowing the housing 120 to be freely tilted.

The opening in the housing 120 is provided with the mirror part 110, for providing a driver with a rearward view, and the display unit 130, which faces the mirror part 110. The display unit 130 is provided on the rear surface thereof with a control unit 140 configured to apply power to the display unit 130 and to process an image.

The control unit 140 performs control to cause the power applied to the display unit 130 to be grounded when a conductive portion 320 of a switch unit 300 is positioned between an upper clip 210 and a lower clip 220. In this case, the power applied to the display unit 130 is set to be substantially equal to 0V.

Preferably, the control unit 140 may be constructed such that the display unit 130 is connected to a monitor control unit (MCU) (not shown), and when the conductive portion 320 is positioned between the upper clip 210 and the lower clip 220, the power applied to the monitor control unit and thus the power applied to the display unit 130 becomes 0 V.

In other words, the control unit 140 may be constructed so as to perform ON/OFF control of the display unit 130 such that the power applied to the display unit 130 becomes 0 V when the conductive portion 320 is positioned between the upper clip 210 and the lower clip 220.

Preferably, the control unit 140 according to the embodiment of the present disclosure may include an integrated circuit configured to apply power to the display unit 130 and to adjust an image taken by a camera (not shown), which is positioned outside the vehicle. The substrate of the integrated circuit may have an ECU provided thereon.

In an embodiment of the present disclosure, the mirror part 110 may be composed of an electronic chromic mirror (ECM) such that the inside mirror controls the reflectivity of incident light, and the control unit 140 may control the reflectivity of the mirror part 110.

Preferably, the control unit 140 is constructed so as to control the reflectivity of the ECM in such a way as to measure the amount of incident light through a luminance sensor (not shown), which is positioned at an end of the housing 120 or on the windshield glass 400, and to control the reflectivity of the ECM depending on the measured amount of light.

Wires 141, which extend from the two poles of the control unit 140, are respectively connected to the two clips in the tilting lever 200 through a wire through hole 240 formed in the tilting lever 200.

The tilting lever 200 is constructed so as to be rotated in the anteroposterior direction of the vehicle about a second shaft 230, which is positioned at an end of the housing 120 and is positioned at a portion of the tilting lever 200 that is partially disposed in the housing 120. The tilting lever 200 is rotated to a predetermined angle in response to a request from user. A recess 250, which is positioned in an end of the tilting lever 200 that is adjacent to the housing 120, is coupled to an end of the support 150, which is disposed inside the housing 120, so as to be moved therewith. Consequently, the housing 120 is tilted in linkage with rotation of the tilting lever 200.

The tilting lever 200 is provided therein with a switch unit 300 configured to allow power to be applied to the display unit 130. The switch unit 300 includes a rod, which extends in the longitudinal direction of the vehicle so as to project in forward and rearward directions of the tilting lever 200.

The rod of the switch unit 300 includes non-conductive portions 310, which project outside the tilting lever 200, and the conductive portion 320, which is electrically connected to the two clips, which are disposed inside the tilting lever 200, when necessary. When the conductive portion 320 of the switch unit 300 is positioned between the ends of the two clips, power is applied to the display unit 130 from the control unit 140. When one of the non-conductive portions 310 is positioned between the two clips, the two clips are not electrically connected to each other, thereby interrupting the application of power to the display unit 130.

Preferably, the rod of the tilting lever 200 may be configured to have a cylindrical shape. The conductive portion 320 may have a diameter greater than that of one of the non-conductive portions 310. The conductive portion 320 may be configured so as to be brought into contact with the upper clip 210 and the lower clip 220, whereas the non-conductive portions 310 may be configured so as to be spaced apart from the upper clip 210 and the lower clip 220.

Each of the two clips, which are disposed inside the tilting lever 200, is configured so as to have a ">"-shaped cross-section. When the conductive portion 320 of the switch unit 300 is positioned between the two clips, the two clips are electrically connected to each other. Preferably, the wires 141, which extend from the two poles of the control unit 140, are respectively connected to the two clips such that power is applied to the display unit 130 when the two clips are electrically connected to each other via the conductive portion 320.

The upper clip 210 and the lower clip 220, each of which has a ">"-shaped cross-section, may be configured so as to exert elastic force with respect to each other such that the two clips are biased toward the conductive portion 320 of the switch unit 300, which is received in the space between the two clips.

The rotational movement of the tilting lever 200 and the input movement of the rod of the switch unit 300 may be performed independently of each other. Specifically, the housing 120 or the mirror part 110 may be tilted by use of the tilting lever 200, and power may be applied to the display unit 130 by input movement of the switch unit 300.

Figure 3:
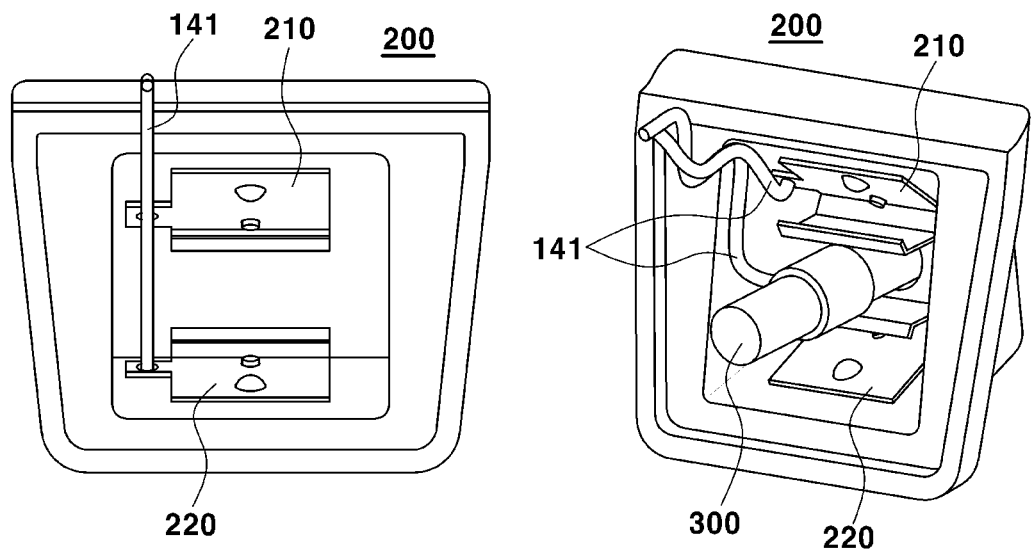
FIG. 3 illustrates a cross-sectional view and a perspective view of a tilting lever according to an embodiment of the present disclosure.
Figure 4:
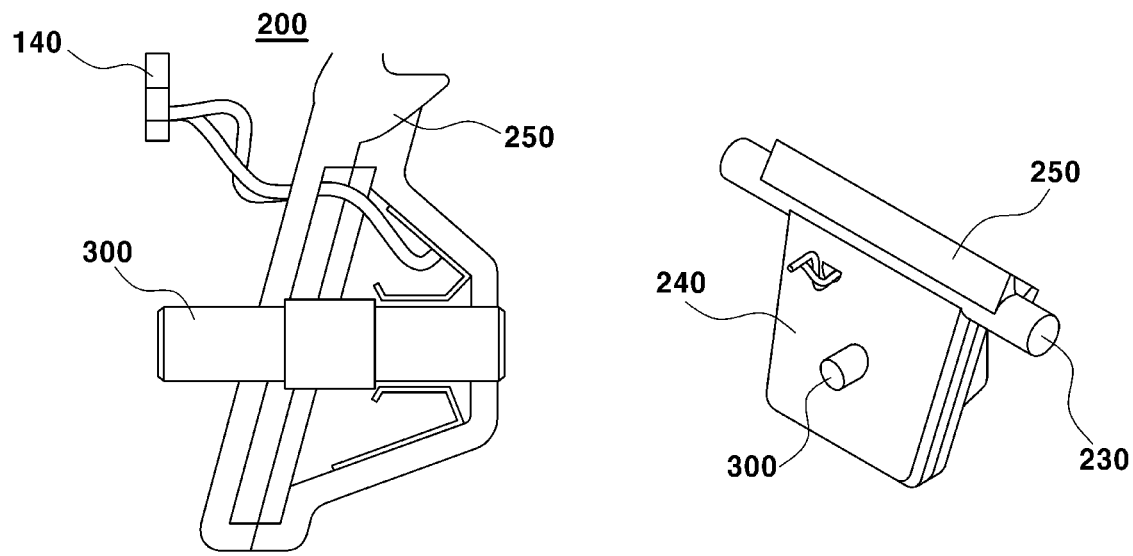
FIG. 4 illustrates a side view and a perspective view of the tilting lever according to an embodiment of the present disclosure.

FIGS. 3 and 4 are views illustrating the internal components of the tilting lever 200 of the display inside mirror 100 according to an embodiment of the present disclosure.

As illustrated in FIGS. 3-4, the tilting lever 200 is configured so as to project from the lower end of the housing 120, and is provided therein with the upper clip 210 and the lower clip 220, which are positioned so as to be spaced apart from each other.

The upper clip 210 and the lower clip 220 are respectively connected to the two pole ends of the control unit 140 via the wires 141, and the switch unit 300 is positioned between the upper clip 210 and the lower clip 220 so as to be moved in the longitudinal direction of the vehicle.

Preferably, the rod of the switch unit 300 is positioned between the upper clip 210 and the lower clip 220. The two ends of the rod are composed of the non-conductive portions 310, and the intermediate portion is composed of the conductive portion 320. Consequently, when the conductive portion 320 is positioned between the upper clip 210 and the lower clip 220, the upper and lower clips 210 and 220 are brought into electrical contact with the conductive portion 320, thereby permitting power to be applied to the display unit 130 from the control unit 140.

In another embodiment of the present disclosure, each of the non-conductive portions 310 is configured to have a cross-section smaller than that of the conductive portion 320 in the height direction. Consequently, the conductive portion 320 is brought into contact with the upper and lower clips 210 and 220 when positioned between the two clips, and one of the non-conductive portions 310 is spaced apart from at least one of the upper and lower clips 210 and 220 when positioned between the two clips.

The tilting lever 200 is at least partially disposed in the housing 120, and includes the recess 250, which is positioned at a portion thereof that faces the support 150 disposed in the housing 120. Accordingly, as the tilting lever 200 is rotated, an end of the support 150 is moved in the longitudinal direction of the vehicle.

Preferably, the tilting lever 200 includes the second shaft 230, which is positioned at a portion thereof that is disposed inside the housing 120, and is rotated in the longitudinal direction of the vehicle about the second shaft 230 upon a user's request. When the tilting lever 200 is rotated in the longitudinal direction of the vehicle about the second shaft 230, the support 150, which is disposed inside the housing 120, is rotated in the opposite direction in the longitudinal direction of the vehicle about a first shaft 151, thereby tilting the housing 120 or the mirror part 110.

The portion of the tilting lever 200 that is disposed in the housing 120 includes the through hole 240 through which the wires 141 connected between the upper and lower clips 210 and 220 and the control unit 140 extend. Preferably, the wires 141, which extend through the through hole 240, are directly connected to the ECU of the control unit 140. Accordingly, power may be applied to the display unit 130 upon input action of the switch unit 300.

Figure 5:
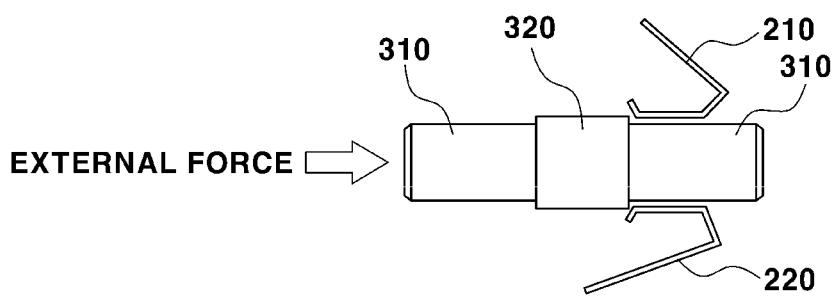
FIG. 5 is a view illustrating electrical engagement relationships between a switch unit and clips according to an embodiment of the present disclosure.
Figure 5:
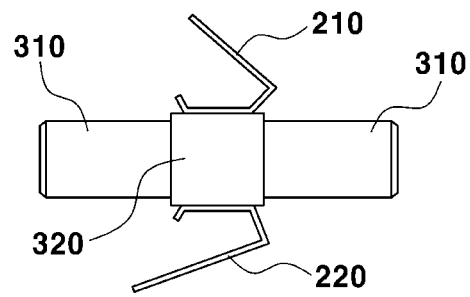

FIG. 5 illustrates the engagement relationships between the switch unit 300 and the two clips according to an embodiment of the present disclosure.

The upper clip 210 and the lower clip 220 are disposed in the tilting lever 200 so as to be spaced apart from each other in the height direction, and the rod of the switch unit 300 is disposed between the upper clip 210 and the lower clip 220 in the longitudinal direction of the vehicle. The rod includes the conductive portion 320, which is positioned at the center thereof, and the non-conductive portions 310, which are positioned at opposite ends of the conductive portion 320. The conductive portion 320 is configured to have a cross-section larger than that of each of the non-conductive portions 310 in the height direction.

The non-conductive portions 310 are configured so as to project from the tilting lever 200 in forward and rearward directions, respectively. One of the non-conductive portions 310 is constructed so as to be inserted into the tilting lever 200 when external force is applied thereto by a user.

Preferably, when one end of the rod, which is oriented in the longitudinal direction, is inserted into the tilting lever 200, the other end of the rod projects from the side of the tilting lever 200 opposite the side of the tilting lever 200 to which the external force is applied. In other words, the rod is constructed such that a portion of the rod projects from one of the two sides of the tilting lever 200.

When external force is applied to the rod in a predetermined direction, the rod is inserted into the tilting lever 200. Consequently, the conductive portion 320 of the rod is positioned between the upper clip 210 and the lower clip 220 and is thus brought into contact both with the upper clip 210 and with the lower clip 220, thereby allowing the upper clip 210 and the lower clip 220 to be electrically connected to each other.

The switch unit 300 according to the embodiment of the present disclosure includes the rod, which is moved in the longitudinal direction by virtue of the external force applied by a user. The conductive portion 320 of the rod is selectively brought into contact with the upper clip 210 and the lower clip 220, thereby allowing the two clips to be electrically connected to each other.

Figure 6:
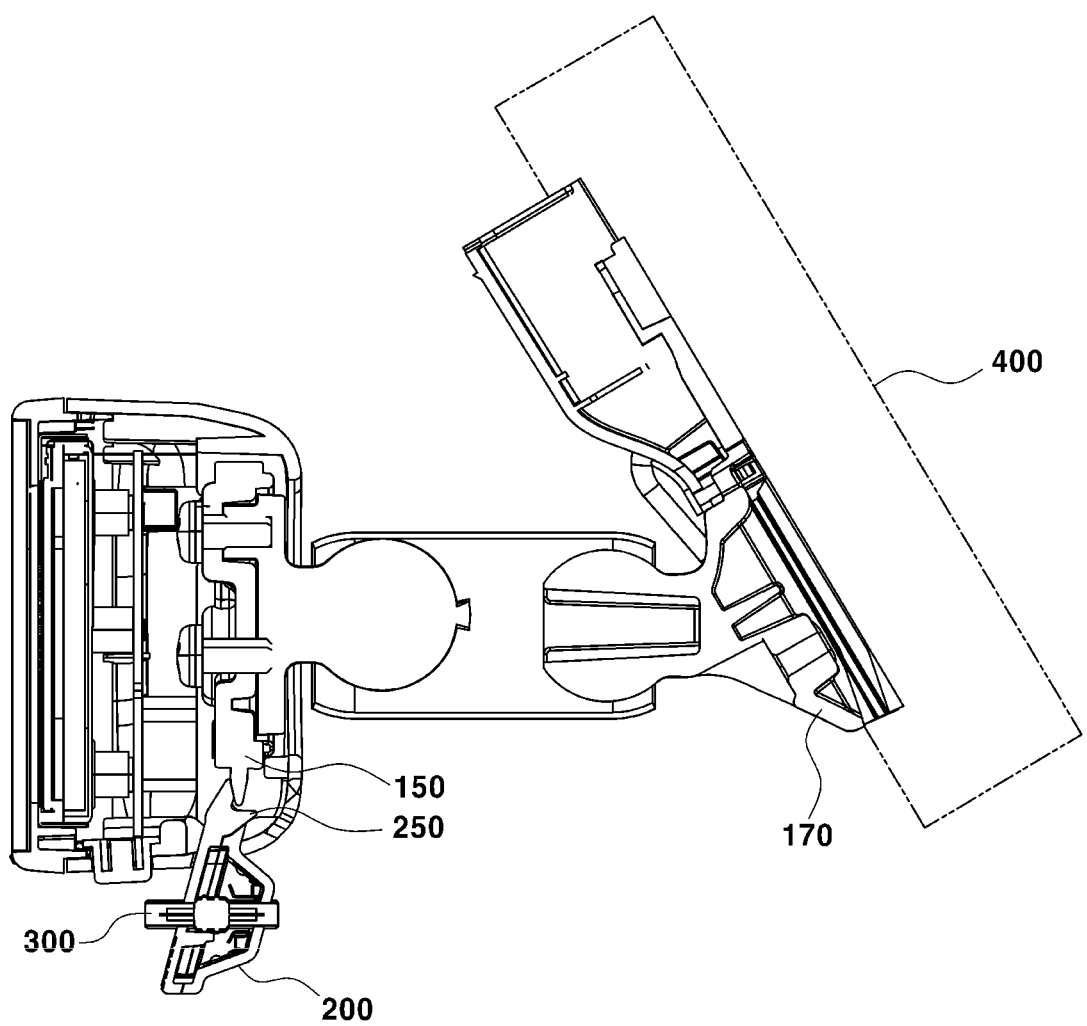
FIG. 6 is a side cross-sectional view of the display inside mirror according to an embodiment of the present disclosure.
Figure 7:
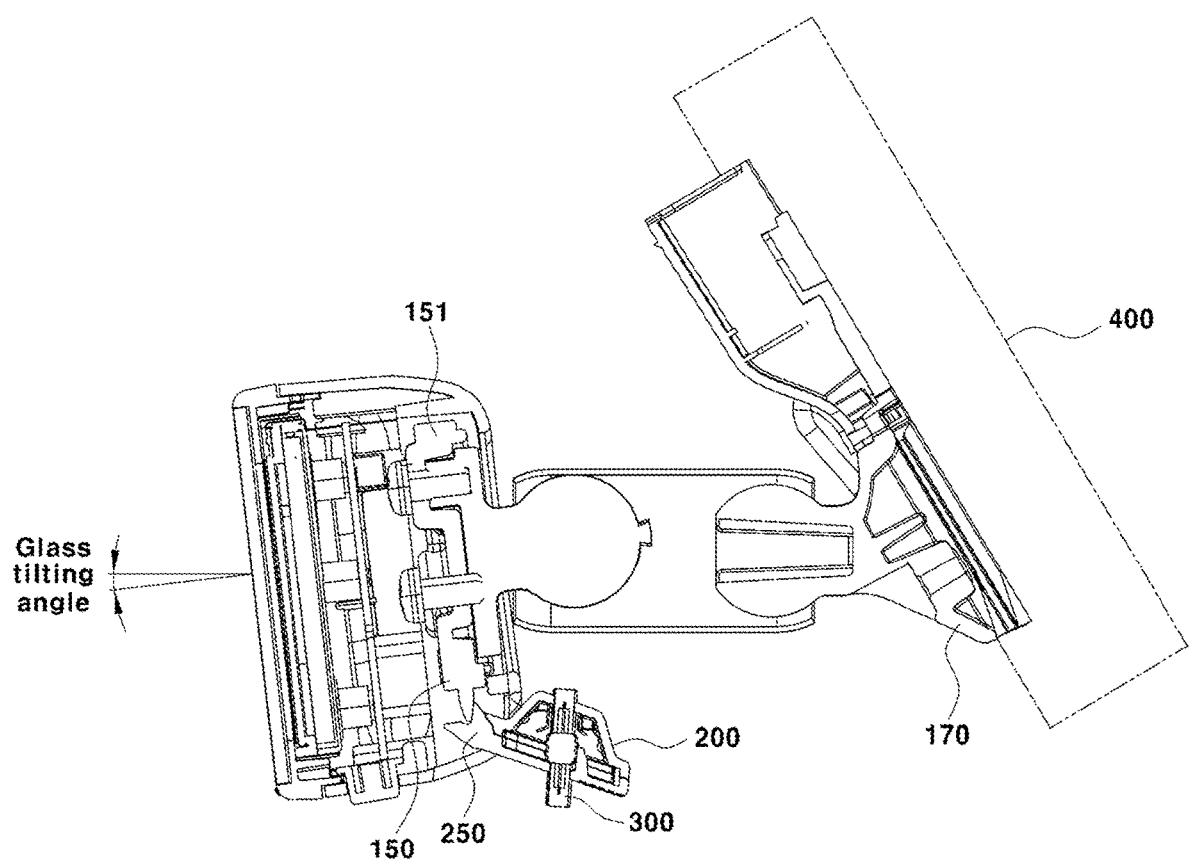
FIG. 7 is a side cross-sectional view illustrating a tilted state of the display inside mirror according to an embodiment of the present disclosure.

FIGS. 6 and 7 illustrate a tilting movement of the mirror part 110 caused by rotation of the tilting lever 200 according to an embodiment of the present disclosure.

FIG. 6 is a side cross-sectional view of the display inside mirror 100 before the tilting movement of the mirror part 110. As illustrated in FIG. 6, the tilting lever 200 is positioned adjacent to the inner surface of the vehicle, and the support 150, which faces the upper end of the tilting lever 200, is positioned inside the housing 120.

When external force is applied to the tilting lever 200 in the forward direction of the vehicle by a user, the end of the tilting lever 200 that is positioned far away from the housing 120 is rotated in the forward direction of the vehicle about the second shaft 230, and thus the upper end of the support 150 disposed in the housing 120 is rotated in the rearward direction of the vehicle about the first shaft 151, as illustrated in FIG. 7.

In other words, when the end of the support 150 that faces the upper end of the tilting lever 200 is rotated in the rearward direction of the vehicle, the upper end of the housing 120 is moved downwards and is thus tilted.

The tilting angle of the mirror surface may be determined by the rotational angles of the tilting lever 200 and the support 150. Preferably, the tilting angle of the mirror surface may be determined based on the angle at which the housing 120 is rotated about the stay mount 160.

Figure 8:
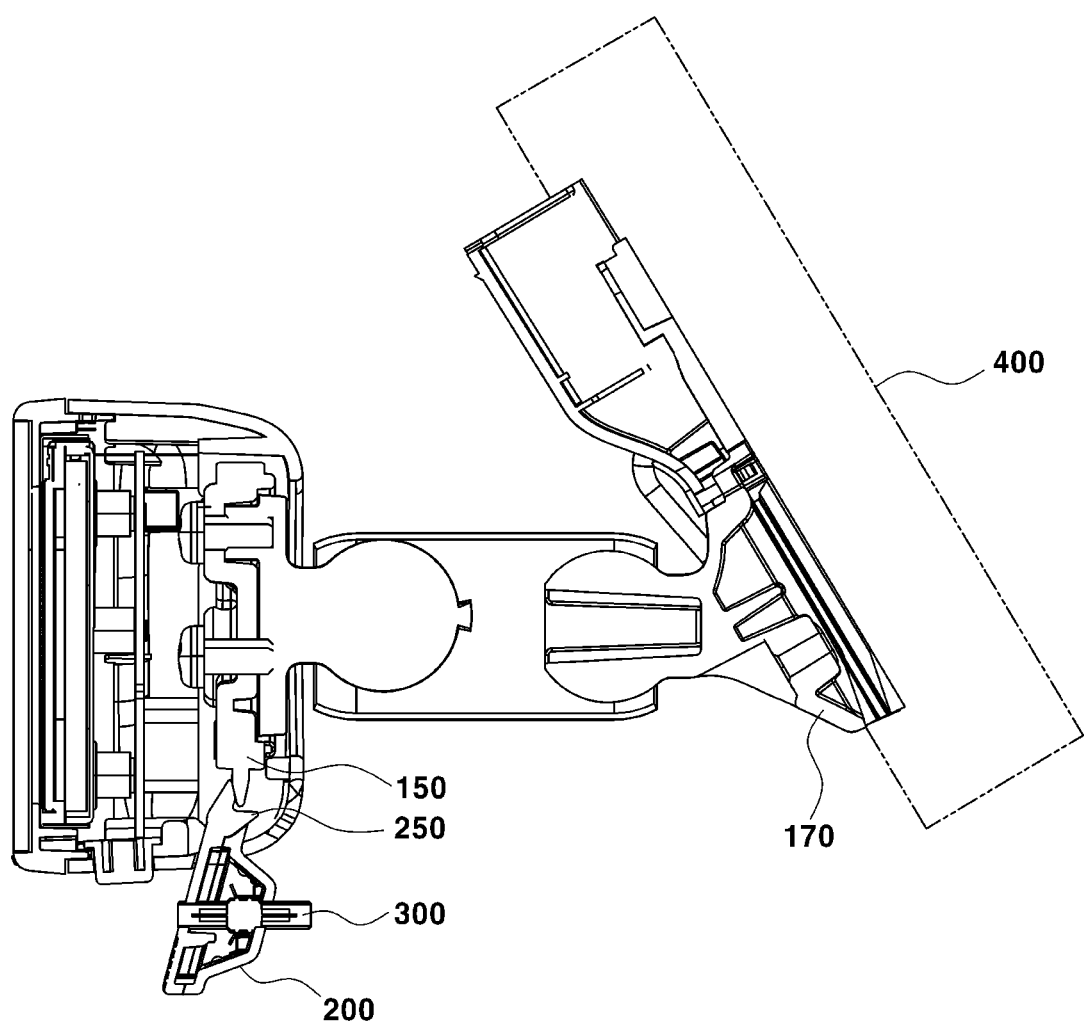
FIG. 8 is a side cross-sectional view illustrating a turning-on state of a display unit of the display inside mirror according to an embodiment of the present disclosure.

FIG. 8 is a side cross-sectional view illustrating the engagement of the switch unit 300 required for operation of the display unit 120 according to an embodiment of the present disclosure.

Independently of the rotational movement of the tilting lever 200, the rod of the switch unit 300 may be inserted into the tilting lever 200 by external force applied by a user. In an embodiment of the present disclosure, the switch unit 300, which is configured to apply power to the display unit 130, may be pushed in the forward direction of the vehicle.

Preferably, in an embodiment of the present disclosure, the rod of the switch unit 300, which is disposed at the tilting lever 200, is constructed such that one end of the rod is inserted in the tilting lever 200 by external force, which is applied in the forward direction of the vehicle by a user, and the other end of the rod projects from the rear surface of the tilting lever 200.

When the rod of the switch unit 30 is inserted into the tilting lever 200 through the front surface of the tilting lever 200, the upper clip 210 and the lower clip 220 are connected to each other via the conductive portion 320 of the rod, thereby allowing the control unit 140 to be electrically connected to the clips via the wires 141.

Preferably, the control unit 140 may receive power from a battery (not shown), which is mounted on the vehicle. The control unit 140 may be set such that the power from the battery is applied to the display unit 130 by virtue of manipulation of the switch unit 300.

FIG. 8 illustrates the switch unit 300, which is able to operate independently of the tilting lever 200. The display unit 130 may be operated independently of tilting movement of the mirror surface according to a user's selection.

In summary, according to the present disclosure, the mirror part 110 may be tilted by use of the tilting lever 200, and the display unit 130 may be operated by use of the switch unit 300 independently of the tilting movement of the mirror part 110. In other words, one of the following operations may be selectively performed: an operation of the display unit 130 in the state in which the display unit 130 is not tilted, an operation of the display unit 130 in the state in which the display unit 130 is tilted, turning-off of the display unit 130 in the state in which the display unit 130 is not tilted, and turning-off of the display unit 130 in the state in which the display unit 130 is tilted.

As is apparent from the above description, the following effects may be obtained by the configuration of the aforementioned components and the coupling relationship and the operational relationship between the components.

The present disclosure provides an effect of improving convenience to a user by enabling tilting movement of the display inside mirror and control of turning-on and turning-off of the display to be performed simultaneously.

Further, the present disclosure provides an effect of providing an optimal structure capable of eliminating a double image represented on a display unit by virtue of an ON/OFF switch of a display, which is constructed integrally with a tilting lever.

The disclosure has been described in detail with reference to preferred embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are included in the scope of the present disclosure. The disclosure is merely an exemplary embodiment for realizing the technical features of embodiments of the present disclosure and may be changed in various forms required in detailed applications and uses. Accordingly, the above detailed description of the present disclosure is not intended to limit the present disclosure to the disclosed embodiments, and the accompanying claims should be understood as including other embodiments.

What is claimed is:

1. A display inside mirror, comprising:
   a housing configured to be secured to a windshield glass, the housing having an opening formed therein;
   a mirror part disposed in the opening;
   a display unit disposed so as to face the mirror part;
   a control unit disposed adjacent to the display unit so as to control transmission of a display image;
   a tilting lever disposed at one end of the housing so as to tilt the mirror part;
   a switch unit disposed at the tilting lever so as to allow power from the control unit to be selectively applied to the display unit;
   an upper clip disposed at an upper end of the tilting lever so as to be adjacent to the switch unit; and
   a lower clip disposed at a lower end of the tilting lever, wherein the upper and lower clips are connected to the control unit via respective wires.

2. The display inside mirror of claim 1, wherein the switch unit is disposed in the tilting lever between the upper clip and the lower clip so as to allow the upper and lower clips to be electrically connected to each other so as to allow power to be applied to the display unit.

3. The display inside mirror of claim 1, wherein the switch unit comprises:
   a conductive portion configured to be positioned between the upper and lower clips so as to be brought into contact therewith; and
   non-conductive portions disposed at two ends of the conductive portion and projecting outwards from the tilting lever.

4. The display inside mirror of claim 3, wherein when the switch unit is pushed into the tilting lever, the conductive portion is brought into contact with the upper and lower clips so as to allow power to be applied to the display unit.

5. The display inside mirror of claim 1, wherein at least a portion of the tilting lever is disposed in the housing, and the portion of the tilting lever that is disposed in the housing is provided with a wire through hole.

6. The display inside mirror of claim 1, further comprising a support disposed in the housing, the support including a first shaft about which the mirror part is tilted, and the support being configured to tilt the mirror part in linkage with a second shaft disposed at an end of the tilting lever.

7. The display inside mirror of claim 6, wherein the end of the tilting lever that faces the support is provided with a recess, and an end of the support is disposed in the recess such that the support is rotated by movement of the tilting lever.

8. The display inside mirror of claim 1, wherein each of the upper and lower clips has a ">"-shaped cross-section such that, when the switch unit is positioned between the upper and lower clips and is engaged therewith, the upper and lower clips exert predetermined elastic force with respect to each other.

9. The system of claim 1, wherein the mirror part is composed of an electronic chromic mirror (ECM).

* * * * *